Figure 1:
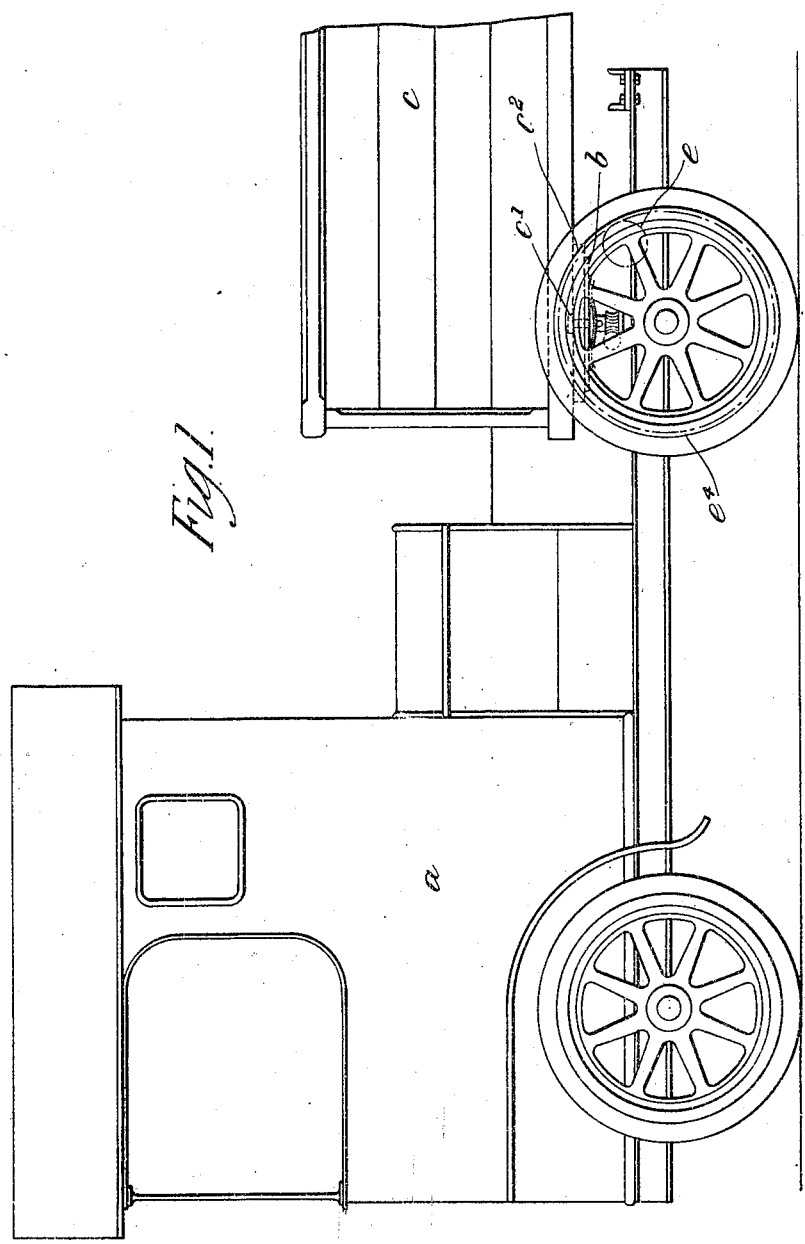

No. 846,772. PATENTED MAR. 12, 1907.
F. E. BEADLE.
TRACTOR.
APPLICATION FILED DEC. 18, 1906.

4 SHEETS—SHEET 1.

WITNESSES
R. A. Balderson
W. W. Swartz

INVENTOR
F. E. Beadle,
by Bakewell & Byrnes,
his Attys.

No. 846,772. PATENTED MAR. 12, 1907.
F. E. BEADLE.
TRACTOR.
APPLICATION FILED DEC. 18, 1906.
4 SHEETS—SHEET 3.

WITNESSES
R A Balderson
W.W. Swartz

INVENTOR
F. E. Beadle,
by Bakewell & Byrnes,
his Attys

No. 846,772. PATENTED MAR. 12, 1907.
F. E. BEADLE.
TRACTOR.
APPLICATION FILED DEC. 18, 1906.
4 SHEETS—SHEET 4.
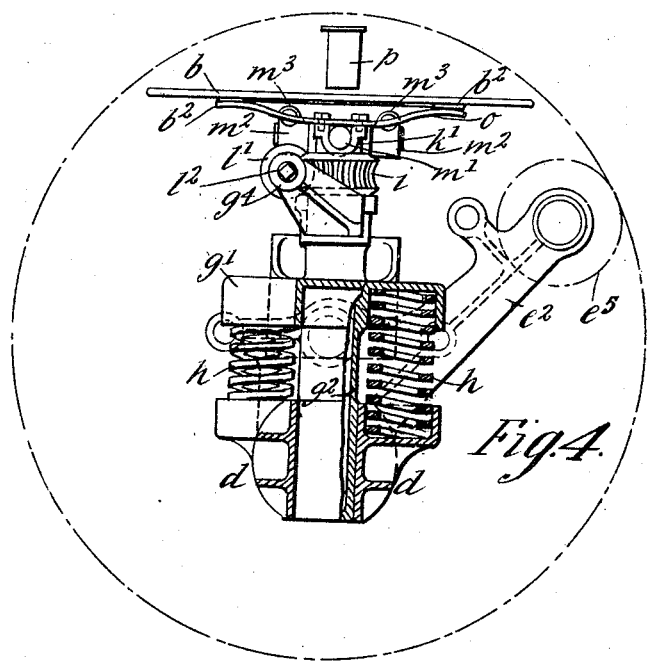
Fig. 4.
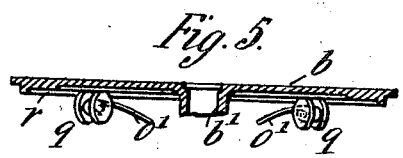
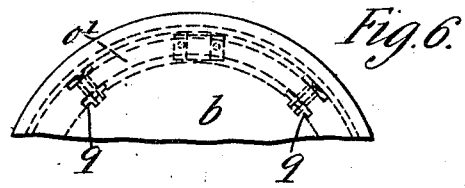
WITNESSES
R. A. Balderson
W. W. Swartz
INVENTOR
F. E. Beadle
by Bakewell & Byrnes
his Attys

UNITED STATES PATENT OFFICE.

FRANK EDWARD BEADLE, OF LONDON, ENGLAND.

TRACTOR.

No. 846,772.  Specification of Letters Patent.  Patented March 12, 1907.

Application filed December 18, 1906. Serial No. 348,487.

*To all whom it may concern:*

Be it known that I, FRANK EDWARD BEADLE, Assoc. Inst. C. E., a subject of the King of Great Britain, residing at London & County Bank, Westminster, in the county of London, England, have invented certain new and useful improvements in Tractors, of which the following is a specification.

It has been proposed to construct self-propelled vehicles with two frames articulated together by a perch-pin which takes the place of the ordinary perch-pin of one frame and is situated over the rear axle of the other frame. The latter carries the motor and is the front frame in running, the vehicle-body being carried by the rear frame. In some constructions of this kind the articulation between the frames has been a universal joint.

The present invention relates to a construction of this kind in which the front frame may be similar in most respects to that of an ordinary motor-car or traction-engine, but is made so that its rear part can be readily substituted for the fore carriage of an ordinary vehicle or of a vehicle made with this object. For this purpose a pin or pillar is arranged at the rear part of the frame of the tractor, preferably over the rear axle.
This pin may be adjustable in height and carries at the top some form of universal joint, whereby is mounted on the pin a turntable or a turn-plate. The fore carriage of the vehicle having been removed, the plate that normally turns on the turn-plate of this fore carriage is attached to the universally-jointed turn-plate carried by the tractor-frame. Where necessary, a system of springs may be interposed between the universal joint and the tractor-frame. When the tractor is to be removed from the wagon or carriage while this is still loaded, trestle-legs or the like, which may be hinged to the wagon or carriage or otherwise carried, may be introduced beneath the wagon or carriage to support it while the turn-plate is detached and the tractor is in use elsewhere. In order that the pin or pillar may be supported on springs independently of the springs that carry the frame of the tractor, it is preferably mounted on a bar which is transverse of the tractor-frame and is suitably guided therein, so that it can move up and down on springs carried by the axle independently of the usual tractor-frame springs. As it is desirable that the pillar should be in the vertical axial plane of the rear wheels, the rear axle of the tractor is specially constructed to accommodate it.

The preferred form of universal joint requires two pillars of the kind described, and in the accompanying drawings, which illustrate the invention, it is this form that is depicted.

Figure 2:
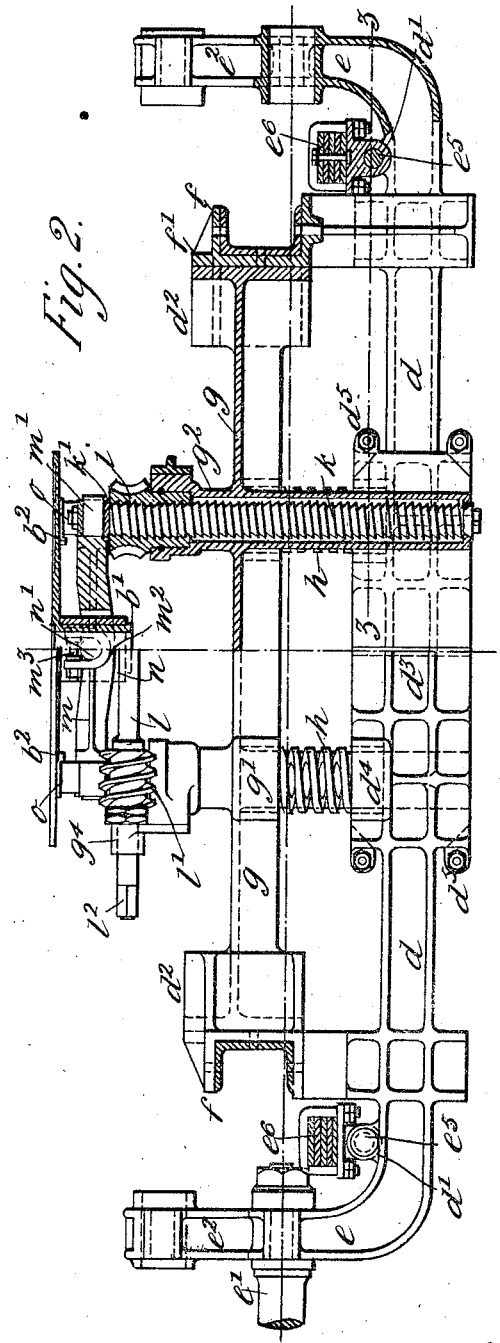
Figure 3:
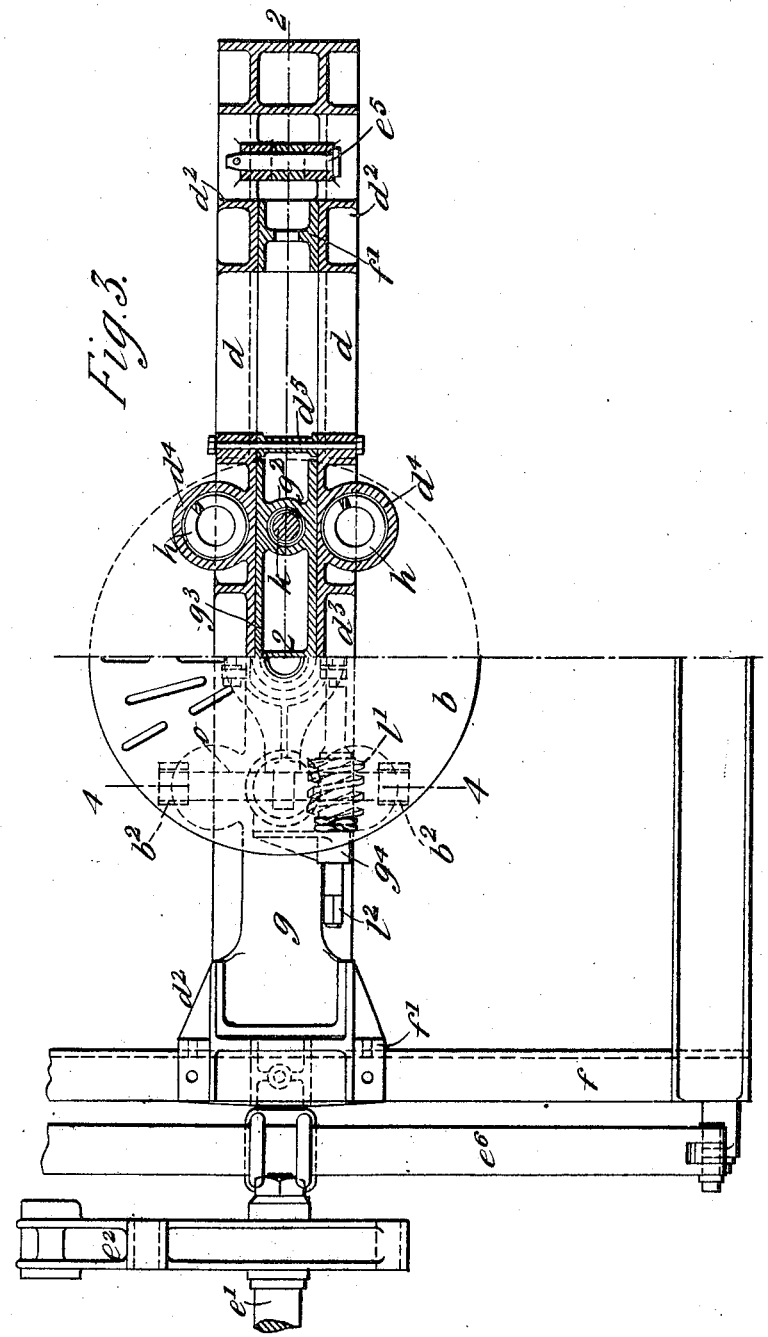

Figure 1 is a part elevation of a tractor $a$, carrying a plate $b$, in which has been inserted a pin $c'$ to attach the under plate $c^2$ of a wagon $c$ whose fore carriage has been removed. Fig. 2 is a sectional front elevation of the rear axle of the tractor, the right-hand half of the figure being in section on line 2 2 of Fig. 3. Fig. 3 is a sectional plan of the rear axle, the right-hand half being in section on line 3 3 of Fig. 2. Fig. 4 is a transverse section through the rear axle, the left-hand half of the figure being partly in section on line 4 4 of Fig. 3 and the right-hand half on line 4' 4' of the same figure. Figs. 5 and 6 are respectively a section and a plan showing a modification of the mode of supporting the plate $b$.

The rear axle is a casting consisting of two channel-irons $d$, spaced apart and united at each end where the axle is turned up to form a bracket $e$, having a bearing for the wheel-spindle $e'$ and having an arm $e^2$, which carries the driving-pinion $e^3$, gearing with a toothed circle $e^4$ on the wheel in known manner. The axle also carries eyes $d'$ for bolts $e^5$, that attach to the axle the usual plate-springs $e^6$, which support the tractor-frame $f$. The latter has horn-plates $f'$, guided in hornblocks $d^2$, which are a part of the casting constituting the axle.

At the middle part of the axle each channel-iron $d$ is expanded to form a web $d^3$, carrying two laterally-projecting cups $d^4$. These webs are bolted together, as at $d^5$, and form a guide, to which reference will presently be made.

Guided in horns carried by the horn-plates $f'$ of the tractor-frame $f$ is a transverse beam $g$, cast in one with which are laterally-projecting inverted cups $g'$, which register with the cups $d^4$ on the webs $d^3$. Between each registering pair of cups is a helical spring $h$. Also cast in one with the beam $g$ are two tubes $g^2$, which extend through the beam and are united at their lower ends by plates $g^3$, adapted to slide in the guide provided by the webs $d^3$. At its upper end each of the tubes $g^2$ is expanded to provide a shoulder for supporting a nut $i$, working on a correspondingly-threaded spindle $k$, which extends into the tube $g^2$.

Adapted to turn in bearings $g^4$, fixed or integral with the tubes $g^2$, is a shaft $l$, having two worms $l'$ in gear, respectively, with worm-wheel teeth cast on the periphery of the nuts $i$. When a suitable crank fitted to the squared end $l^2$ of shaft $l$ is turned, the nuts $i$ are rotated and the spindles $k$ raised or lowered.

The top of each spindle $k$ is formed as a bearing $k'$ for a trunnion $m'$, turned on the end of a casting $m$, having a circular hole through its middle part for accommodation of a short cylinder $n$, trunnions $n'$ on which are supported in bearings $m^2$ on the casting $m$. Bolts $m^3$ serve to retain the trunnions $n'$ in place. The cylinder $n$ forms a bush for a central cylindrical flange $b'$ of the plate $b$. The latter carries on its under surface four guides $b^2$ for the ends of plate-springs $o$, mounted on the spindles $k$.

It will be seen that the plate $b$ is capable of oscillating in two planes at right angles to each other. It is also adjustable to any height above the frame of the tractor within the limit of the length of the spindles $k$. The cylindrical flange $b'$ receives the pin $c'$, Fig. 1, to attach the ordinary under plate of a wagon, omnibus, or the like to the table $b$, ferrule $p$ being inserted if the pin is of small diameter.

It is sometimes desirable that the plate $b$ should be capable of turning on its axis. For this purpose the construction shown in Figs. 5 and 6 may be adopted, wherein the springs $o'$, corresponding with the springs $o$ of the construction just described, are curved and carry on their ends rollers $q$, bearing against a circular path $r$ on the under surface of plate $b$.

In the foregoing illustration of the invention the universal joint is mounted in such a manner that it can be adjusted in height so that the tractor may be adapted to haul any one of a number of vehicles of different build. When the tractor is to be used for hauling any one of a number of vehicles of the same build, it is not essential that the height of the universal joint above the tractor-frame should be adjustable.

Having thus described the nature of this invention and the best means I know of carrying the same into practical effect, I claim—

1. A tractor for hauling vehicles comprising a support, a universal joint mounted on the said support and a turn-plate mounted on the said universal joint.

2. A tractor for hauling vehicles comprising a support, means for adjusting the height of the said support, a universal joint mounted on the said support and a turn-table mounted on the said universal joint.

3. A tractor for hauling vehicles comprising a rear axle diverted from the axial plane of the wheels, a support mounted in the said axial plane, means for adjusting the height of the said support, a universal joint mounted on the said support and a turn-table mounted on the said universal joint.

4. A tractor for hauling vehicles comprising a rear axle, two channel-irons spaced apart and united at their ends constituting the said axle, a support mounted on the said axle and guided between the said channel-irons, means for adjusting the height of the said support, a universal joint mounted on the said support and a turn-table mounted on the said universal joint.

5. A tractor for hauling vehicles comprising a rear axle, a support, springs carrying the said support and carried by the said axle, a universal joint mounted on the said support and a turn-plate mounted on the said universal joint.

6. A tractor for hauling vehicles comprising a rear axle, a support, springs carrying the said support and carried by the said axle, means for adjusting the height of the said support, a universal joint mounted on the said support and a turn-table mounted on the said universal joint.

7. A tractor for hauling vehicles comprising a rear axle, a tractor-frame, springs carrying the said tractor-frame and mounted on the said axle, a transverse beam guided in the said tractor-frame, springs carried by the said axle and carrying the said beam, a support mounted on the said beam, a universal joint mounted on the said support and a turn-plate mounted on the said universal joint.

8. A tractor for hauling vehicles comprising a rear axle, two pillars mounted in the axial plane of the said axle, means constituting a universal joint carried by the said pillars and a turn-plate mounted on the said universal joint.

9. A tractor for hauling vehicles comprising a rear axle, two pillars mounted in the axial plane of the said axle, a casting, trunnions on the said casting, bearings on the said pillars to receive the said trunnions, a cylinder, trunnions on the said cylinder at right angles to its axis, bearings on the said casting to receive the said trunnions on the said cylinder, a turn-plate and a cylindrical central flange on the said turn-plate adapted to fit the said cylinder.

10. A tractor for hauling vehicles comprising a rear axle, two channel-irons spaced apart and united at their ends constituting the said rear axle, a tractor-frame, a transverse beam guided in the said tractor-frame, springs carried by the said axle and carrying the said beam, two tubes carried by the said beam and guided between the said channel-irons, a nut supported at the upper end of each of the said tubes, worm-teeth on the periphery of each nut, a screw-threaded spindle adapted to work in the said nut and extending into the said tube, a shaft adapted to be rotated, two worms on the said shaft gearing with the worm-teeth on the two nuts respectively, means constituting a universal joint mounted on the said spindles and a turn-plate carried by the said universal joint.

11. A tractor for hauling vehicles comprising a rear axle, two channel-irons spaced apart and united at their ends constituting the said rear axle, a tractor-frame, a transverse beam guided in the said tractor-frame, springs carried by the said axle and carrying the said beam, two tubes carried by the said beam and guided between the said channel-irons, a nut supported at the upper end of each of the said tubes, worm-teeth on the periphery of each nut, a screw-threaded spindle adapted to work in the said nut and extending into the said tube, a shaft adapted to be rotated, two worms on the said shaft gearing with the worm-teeth on the two nuts respectively, a casting, trunnions on the said casting, bearings on the said spindles to receive the said trunnions, a cylinder, trunnions on the said cylinder at right angles to its axis, bearings on the said casting to receive the said trunnions on the said cylinder, a turn-plate and a cylindrical central flange on the said turn-plate adapted to fit the said cylinder.

In testimony whereof I have signed my name to this specification in the presence of two subscribing witnesses.

FRANK EDWARD BEADLE.

Witnesses:
JOSEPH WILLARD,
W. J. SKERTEN.